United States Patent [19]

Ramler et al.

[11] Patent Number: 5,344,202
[45] Date of Patent: Sep. 6, 1994

[54] END EFFECTORS WITH INDIVIDUALLY POSITIONABLE VACUUM CUPS

[75] Inventors: David J. Ramler, Maple Grove; Lon A. Adamietz, Plymouth, both of Minn.

[73] Assignee: Dimension Industries, Inc., Maple Grove, Minn.

[21] Appl. No.: 950,021

[22] Filed: Sep. 24, 1992

[51] Int. Cl.⁵ .................... B25J 15/06; B66C 1/02
[52] U.S. Cl. .................... 294/64.1; 414/627; 901/40
[58] Field of Search ............ 294/64.1, 65; 269/21; 271/90, 94; 414/627, 737, 752; 901/40

[56] References Cited

U.S. PATENT DOCUMENTS

| | | | |
|---|---|---|---|
| 2,177,967 | 10/1939 | Watkins | 294/64.1 X |
| 2,247,787 | 7/1941 | Schmidt | 294/64.1 X |
| 3,060,660 | 10/1962 | Reading | 414/737 X |
| 3,168,204 | 2/1965 | Voullaire | |
| 3,198,348 | 8/1965 | Cummings | 294/64.1 X |
| 3,386,224 | 6/1968 | Shuttleworth | |
| 3,406,837 | 10/1968 | Kirsch et al. | |
| 3,637,249 | 1/1972 | Kuhl et al. | 294/64.1 |
| 3,702,698 | 11/1972 | Schwebel | 294/64.1 X |
| 3,836,017 | 9/1974 | Bargstedt | |
| 4,553,892 | 11/1985 | Huffman et al. | 294/64.1 X |
| 4,557,659 | 12/1985 | Scaglia | 294/64.1 X |
| 4,571,320 | 2/1986 | Walker | 294/65 |
| 4,627,785 | 12/1986 | Mon Forte | 901/40 X |
| 4,648,588 | 3/1987 | Carrell | 901/40 X |
| 4,657,470 | 4/1987 | Clarke et al. | 294/64.1 X |
| 4,674,784 | 6/1987 | Wooley | 294/64.1 |
| 4,720,227 | 1/1988 | Eberle | 294/64.1 X |
| 4,744,595 | 5/1988 | Tonning et al. | 294/65 |
| 4,763,941 | 8/1988 | Sniderman | 294/64.1 |
| 4,801,429 | 1/1989 | Turfs et al. | 414/737 X |
| 4,917,427 | 4/1990 | Scaglia | 294/64.1 |

*Primary Examiner*—Johnny D. Cherry
*Attorney, Agent, or Firm*—Jacobson & Johnson

[57] ABSTRACT

An end effector having an individually positionable piston formed directly onto a movable pipe with one end of the movable pipe connected to a common plenum chamber and the other end to a bellows-shaped collapsible vacuum cup with the movable pipe forming an elongated air evacuation chamber to permit quick evacuation and pickup of an article located proximate the bellows-shaped collapsible vacuum cup and a stabilizer located proximate the bellows-shaped collapsible vacuum cup to act as a stop to prevent swaying of the article as the bellows-shaped collapsible vacuum cup is moved from one position to another.

3 Claims, 7 Drawing Sheets

END EFFECTORS WITH INDIVIDUALLY POSITIONABLE VACUUM CUPS

FIELD OF THE INVENTION

This invention relates generally to end effectors and, more specifically, to quick response end effectors that can be disassembled by hand to permit one to clean the end effector components that come into contact with bacteria harboring articles.

BACKGROUND OF THE INVENTION

The concept of end effectors is old in the art. Generally, end effectors comprise a tool that is located at the end of a robotic arm. In one type of end effector, the end effector performs the pickup or grasping function while the robotic arm performs the displacement and movement of the article grasped by the end effector. End effectors often use a vacuum source or negative pressure to pick up an article. Generally, vacuum pickup devices are slower than mechanical pickup devices since there is a time lag to lower the pressure in the end effector to a level for lifting an object. A further difficulty with end effectors that use vacuum and are used to pick up food products is that oftentimes food particles get drawn into the end effector where they remain to cause possible contamination of subsequent articles handled by the end effector. The present invention through use of a vacuum source located in the end effector greatly reduces the pick up time. In addition, the end effector of the present invention can be disassembled without tools to permit a person to easily clean the end effector.

DESCRIPTION OF THE PRIOR ART

U.S. Pat. No. 3,060,660 shows an egg handling device with a flexible egg cup and a reinforcing cup for holding one end of the egg and a back-up reinforcing cup to support the opposite end of the egg. A flat valve spring bends to open an orifice to a vacuum source. The unit contains valves and springs that are not readily disassembled for cleaning.

U.S. Pat. No. 4,553,892 shows a robotic pick-up device that has a sensing arm that senses the stop motion and stops movement of the robotic arm to allow the pressure to engage and lift the article.

U.S. Pat. No. 4,571,320 shows a device for picking up articles that includes limit switches for detecting the presence of the article in the device.

U.S. Pat. No. 3,168,204 shows an apparatus for picking up fruit in which a suction cup is placed over the fruit and the suction cups are gang mounted on a device to place the fruit into a box. The pickup device includes an articulated lifting member.

U.S. Pat. No. 4,744,595 shows a positioning device for hosting a plurality of vacuum cups which are mounted on a scissor-like member.

U.S. Pat. No. 3,836,017 shows an apparatus for transferring articles between a conveyor and a stand that uses vacuum cups.

U.S. Pat. No. 4,674,784 shows a suction-type gripping mechanism with a magnetic actuated vacuum valve.

U.S. Pat. No. 4,648,588 shows a plurality of vacuum fingers that are permanently mounted for picking up and moving items in a generally horizontal plane.

U.S. Pat. No. 4,720,227 shows a vacuum pick-up device with a t-bar to assist in disengagement of the device being picked up.

U.S. Pat. No. 4,627,785 shows an end effector with a vacuum cup that is movable upward and downward to pick up an article through use of a vacuum.

U.S. Pat. No. 4,557,659 shows a device for lifting and transferring large loads by use of one or more suction pads for attaching to the article. A valve or sensor is located internally within the suction cup to send a signal to control the vacuum pressure at the suction pad.

U.S. Pat. No. 3,406,837 shows another vacuum pick-up device for lifting and swinging articles from one location to another.

U.S. Pat. No. 3,386,224 shows a case packer that moves objects by vacuum cups.

U.S. Pat. No. 4,801,429 shows a sample handling device with a vacuum pick-up.

SUMMARY OF THE INVENTION

Briefly, the invention comprises an end effector which can be taken apart for cleaning without the use of tools with the end effector including finger activateable slide latches for holding the components of the end effector together. The end effector includes a housing with a plenum chamber containing a vacuum source that extends directly into the plenum chamber to permit rapid pickup of an article through axial displacement of a vacuum piston located in the plenum chamber. The housing includes side walls and a bottom with the side walls having openings for receiving the cover latch. The use of finger-activated slide latches permits a user to assemble or disassemble the end effector without the use of any tools.

DESCRIPTION OF THE PREFERRED EMBODIMENT

Figure 1:
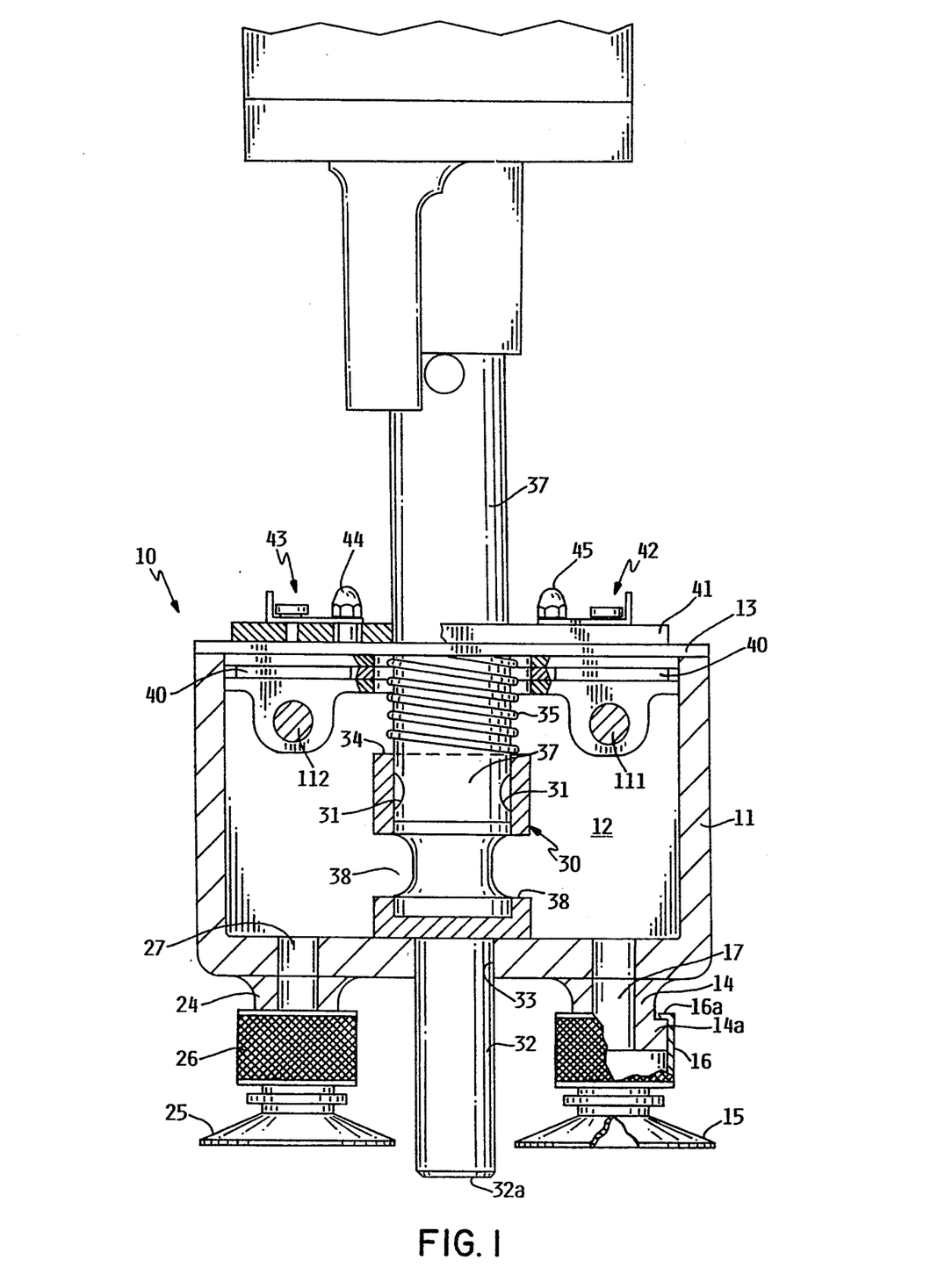
FIG. 1 is a partial cross section view of the end effector prior to engaging an article.

Referring to FIG. 1, reference numeral 10 generally designates the end effector for use in picking up articles. The end effector comprises a housing 11 and a plenum chamber 12 with a cover 13 located thereon. Extending downward from housing 11 is a first extension member 14 that connects to flexible vacuum cup 15 through a flexible cylindrical coupling 16 having a lip 16a for engaging annular extension 14a on member 14. An air passage 17 connects plenum chamber 12 to flexible vacuum cup 15. Similarly, on the opposite side of housing 11 there is a second extension member 24 connected to a flexible vacuum cup 25 through a second flexible cylindrical coupling 26. A fluid passage 27 connects plenum chamber 12 to flexible vacuum cup 25. Located in plenum chamber 12 is an axially displaceable cylindrical cup 30 that forms a vacuum piston for opening and closing passages to the vacuum source present in tube 37. Cylindrical cup 30 has lateral air inlets 38 and a sensing rod 32 connected thereto. Sensing rod 32 slideably extends through an opening 33 in housing 11. Extending through cover 13 is a vacuum tube 37 having an outer cylindrical surface with lateral air inlets 38. Located around vacuum tube 37 and in engagement with the underside of cover 13 is one end of a compression spring 35. The other end of compression spring 35 is in engagement with the top surface 34 of cylindrical cup 30.

An O-ring 40 extends around the interior surface of cover 13 to form a sealing engagement between the cover and interior sidewalls of housing 11. Connected to vacuum tube 37 is a rectangular shaped flange 41 having a pair of finger-activated slide latches 43 and 42 thereon. Connected to cover 13 for engagement with finger-activated slide latches 42 and 43 are, respectively, shoulder pins 44 and 45.

Figure 2:
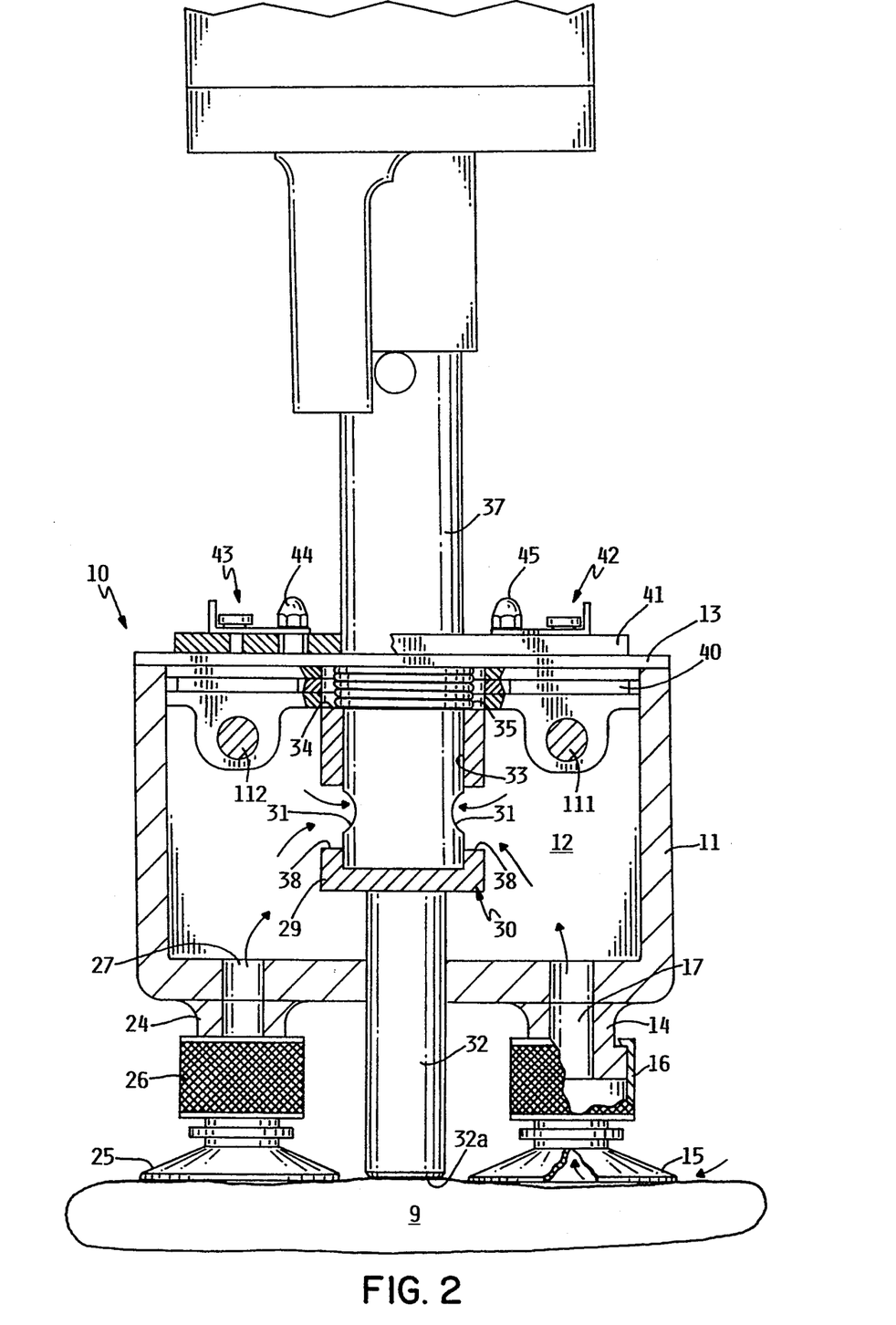
FIG. 2 is a partial cross section showing the end effector about to engage and lift an article.

In order to illustrate the operation of end effector 10, reference should be made to FIG. 2 which shows end effector 10 about to pick up an article 9. Note that sensor rod 32 has been axially displaced upward by engagement of end 32a with article 9 which is to be picked up through use of negative pressure. The upward displacement of sensor rod 32 forces vacuum piston 30 upward until lateral air inlets 38 on cylindrical cup 29 of piston 30 are in alignment with lateral air inlets 31 in vacuum tube 37. The alignment of lateral inlets 31 and 38 allows air present in plenum chamber 12 to be quickly sucked out through tube 37 since the vacuum tube 37 extends into the center of plenum chamber 12 to provide rapid lowering of pressure in plenum chamber 12. Plenum chamber 12 is sufficiently large in relation to the lateral air inlet 38 so as to have a slower plenum air velocity that allows heavy particles sucked through the flexible vacuum cup 15 and 25 to fall out of the air stream and be deposited in plenum chamber 12 for later disposal rather from being sucked into the vacuum tube 37.

As air is removed from plenum chamber 12, the air aim flows through vacuum cup 15, fluid passage 17 and into lateral air inlet 38 of vacuum tube 37. Similarly, air is drawn through vacuum cup 25, air passage 27, into plenum chamber 12 and therein into lateral inlet 38. The result is a rapid evacuation of chamber 12 allowing the article 9 to be picked up quickly. That is, the vacuum tube 37, which extends down into the plenum chamber 12, is completely evacuated prior to activation of the vacuum piston so that delay time for evacuation of vacuum tube 37 is eliminated. Consequently, plenum chamber 12 and flexible vacuum cups 15 and 25 quickly produce a negative pressure to pick up article 9. Consequently, through positioning the vacuum source (end of vacuum tube 37) directly in plenum chamber 12 rather than remote of end effector 10, one eliminates the lag time to evacuate vacuum lines connected to vacuum tube 37. Thus, delays in making the end effector responsive have been minimized by bringing the vacuum source and the switch for the vacuum source directly to the terminal portion of end effector 10.

Figure 3:
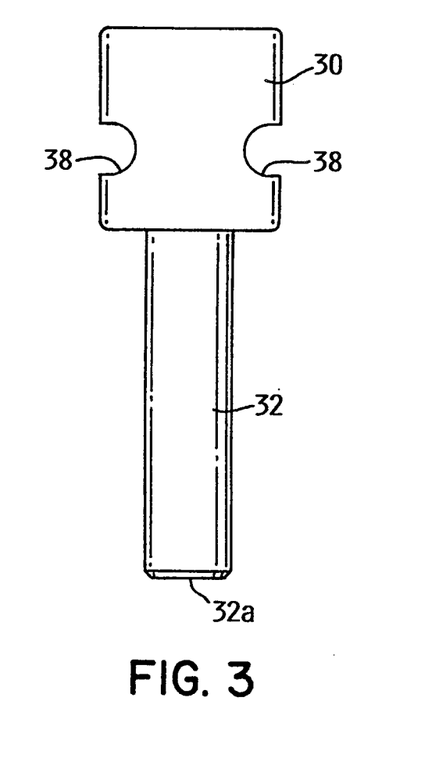
FIG. 3 shows a side view of the vacuum piston valve.
Figure 4:
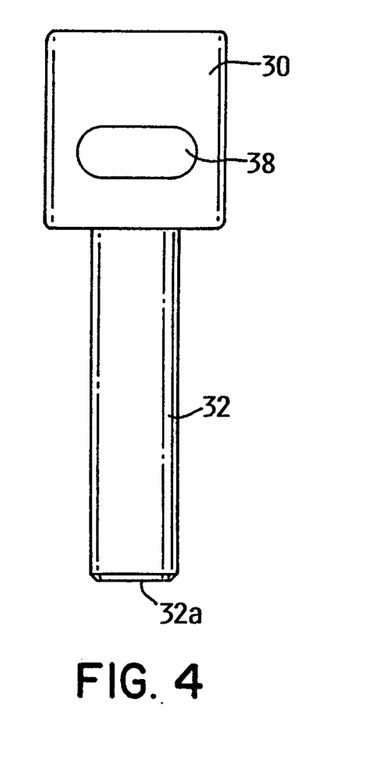
FIG. 4 shows a front view of the vacuum piston valve in FIG. 3.

In order to better view the vacuum piston 30, reference should be made to FIGS. 3 and 4 which show a side and front view of vacuum piston 30. The vacuum piston has a cylindrical rod 32 that slidingly engages opening 33 with lateral openings 38 for alignment with the lateral openings in vacuum tube 37. The lower end of vacuum tube 37 slidingly fits within the cylindrical opening in the vacuum piston with sufficient clearance to allow vacuum piston 30 to freely slide up and down as shown in FIG. 1 and FIG. 2. The clearance between the exterior of vacuum tube 37 and the interior of the vacuum piston should not be so large so that air leakage into vacuum tube 37 produces a vacuum at the flexible vacuum cups 15 and 25 when the vacuum piston is in a closed condition.

Figure 5:
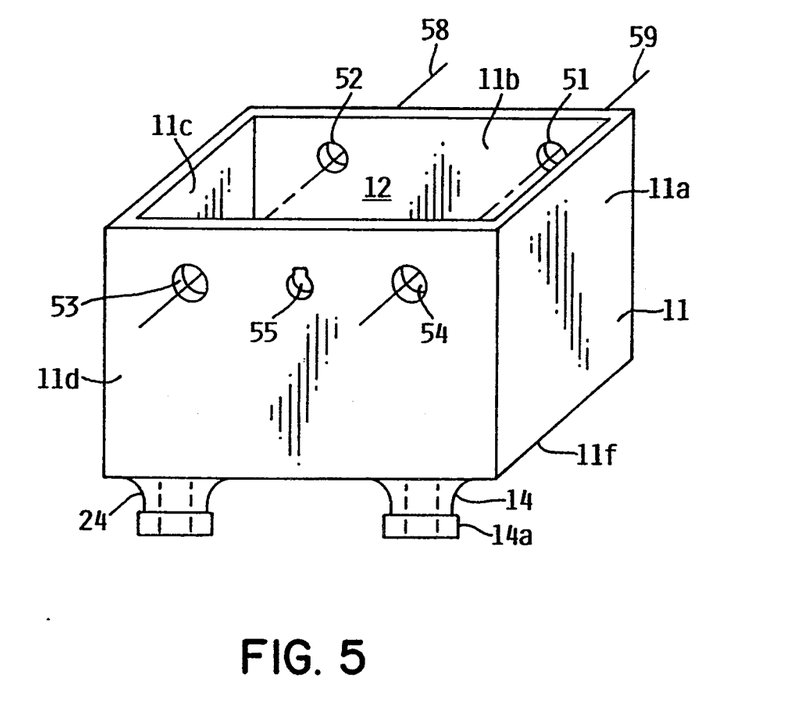
FIG. 5 shows a pictorial view of the end effector housing and plenum chamber.

One of the features of the present invention is that the end effector can be completely disassembler by hand to permit cleaning of the end effector when it is used with bacteria containing food products such as meat and vegetables. Referring to FIG. 5, the one piece housing 11, which is formed from a block of polymer plastic, is shown in the unattached condition. Briefly, housing 11 includes a first side wall 11a, a second side wall 11b, a third side wall 11c, a fourth side wall 11d and a bottom 11f all connected together to form plenum chamber 12. Extension members 14 and 24 extend out from the bottom of housing 11 to engage and hold flexible vacuum cups thereon through use of flexible cylindrical couplings. Located in front side wall 11d is a first cylindrical bore 53 and a second cylindrical bore 54. Similarly, located in back side wall 11b is a first cylindrical bore 52 and a second cylindrical bore 51. A central axis 58 extends through bores 52 and 53 and a central axis 59 also extends through bores 51 and 54. Axes 58 and 59 are located in spaced parallel relationship to each other. Projecting outward from the front side wall 11d is a shoulder pin 55 for engagement with a slide latch to secure a cover latch to housing 11 to secure cover 13 to housing 11.

Figure 6:
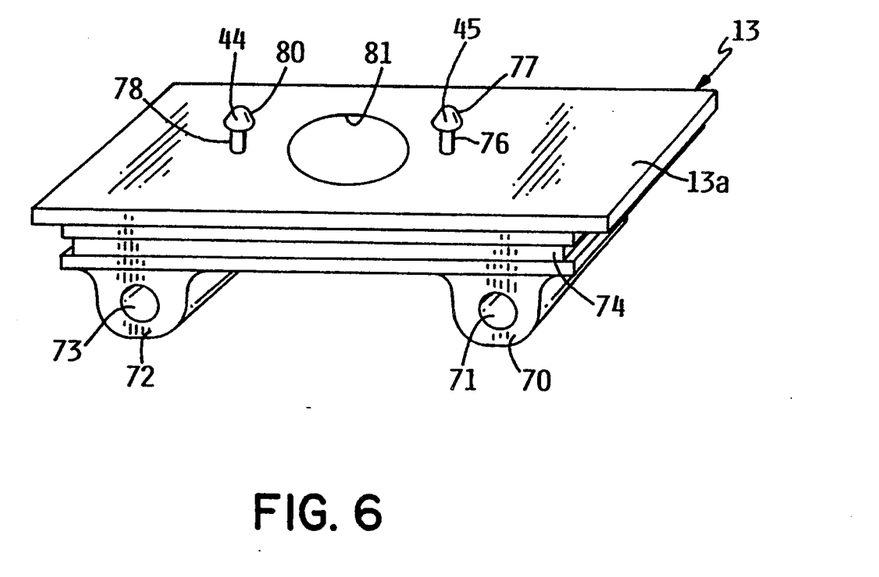
FIG. 6 shows a pictorial view of the cover for securing to the end effector housing of FIG. 5.

Referring to FIG. 6, cover 13 is shown in greater detail and comprises a top member 13a having a first shoulder pin 44 and a second shoulder pin 45 extending upward from cover top member 13a. Shoulder pin 45 includes a shank 76 and a head 77. Similarly, shoulder pin 44 includes a shank 78 and a head 80. Located between shoulder pins 44 and 45 is an opening 81 for receiving vacuum tube 37. Located on the bottom of cover 13 is an O-ring TM groove 74 for receiving an O-ring TM for sealing against interior side walls of housing 11. Extending downward is a first shoulder 72 having a first cylindrical bore 73 therein and a second shoulder 70 having a second cylindrical bore 71 therein.

Figure 7:
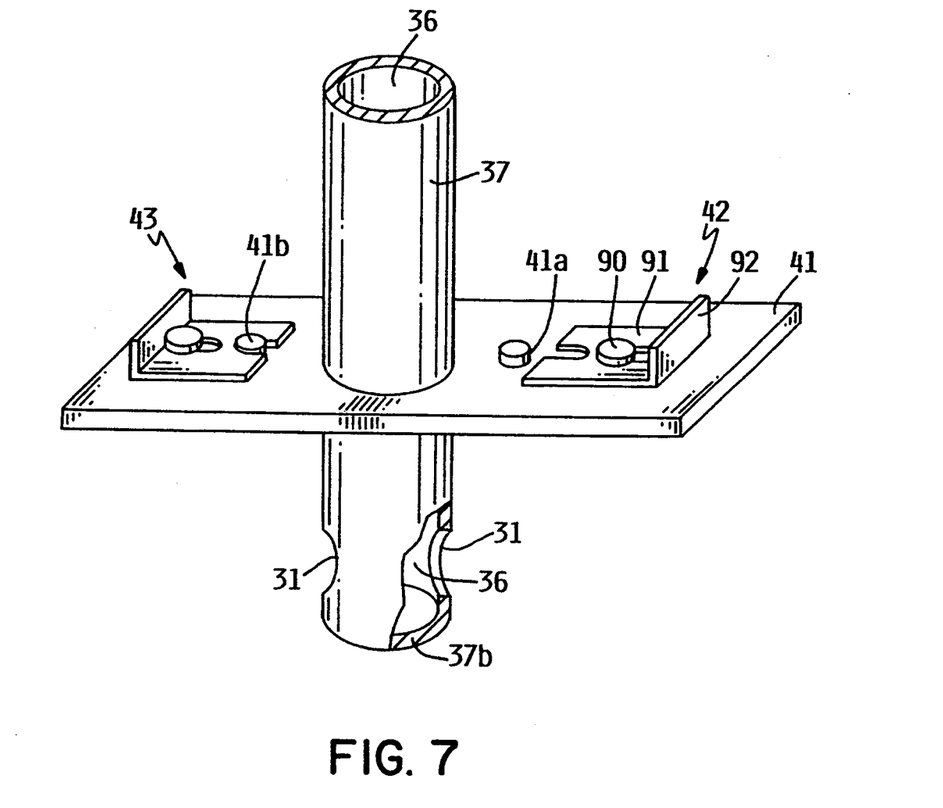
FIG. 7 shows a pictorial view of the vacuum pipe for connection to the cover of FIG. 6.

Referring to FIG. 7, details of vacuum tube 37 and vacuum tube flange 41 are shown in greater detail. Briefly, vacuum tube 37 includes a rectangular flange 41 that is secured to the exterior of vacuum tube 37. Located in flange 41 is a first opening 41a for extending over shoulder pin 45 of cover 13 and a second opening 41b for extending over shoulder pin 44 on cover 13. The bottom portion of vacuum tube 37 is cut away revealing lateral openings 31, end cap 37b and fluid passage 36 which extends through vacuum tube 37.

Figure 8:
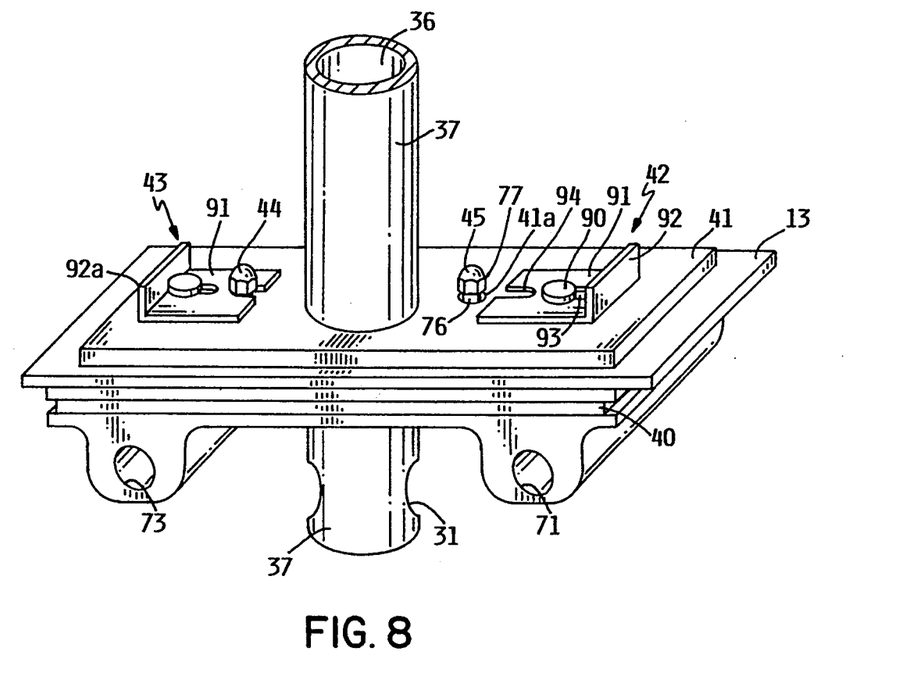
FIG. 8 shows a pictorial view of the vacuum cover connected to the vacuum pipe of FIG. 7 through slide fasteners.

Referring to FIG. 8, vacuum tube 37 is shown attached to cover 13 through use of shoulder pins 44 and 45 and slide latches 42 and 43. That is, shoulder pin 45 is firmly connected to cover 13 and extends through opening 41a in flange 41. In order to describe the operation of slide latches 42 and 43, reference will be made to slide latch 42 and shoulder pin 45 since both slide latches 42 and 43 are identical. In the embodiment, shoulder pin 45, which is also identical to shoulder pin 44, extends through opening 41a in flange 41. Slide latch 42 is shown in the unlatched position. In the unlatched position, a pivot pin 90, which is secured to flange 41 is located in one end of a slot 93 in plate 91. A slot 94 for extending around shank 76 on the underside of shoulder pin 45 is located in the other end of plate 91. Extending upward at a right angle from plate 91 is a member 92 for engagement by a user's finger or the like. To illustrate the operation of the unit in the latched position, reference should be made to slide latch 43 which shows an identical plate 91 extending toward the right so that plate 91 engages the underside of shoulder pin 44. Slide latch 43 is shown in the latched position, that is, vacuum tube 37 and flange 41 are prevented from upward movement with respect to cover 13 by the engagement of shoulder pin 44 with plate 91 of the finger-activated slide latch 43. Consequently, the only means for holding flange 42 and vacuum tube 37 on cover 13 are the slide latches 42 and 43 and their respective shoulder pins 45 and 44.

To separate vacuum cover 13 and flange 41 for cleaning purposes, the operator merely has to slide latches 42 and 43 to the open or unlatched position thus allowing the operator to lift vacuum tube 37 and flange 41 free of cover 13.

Figure 9:
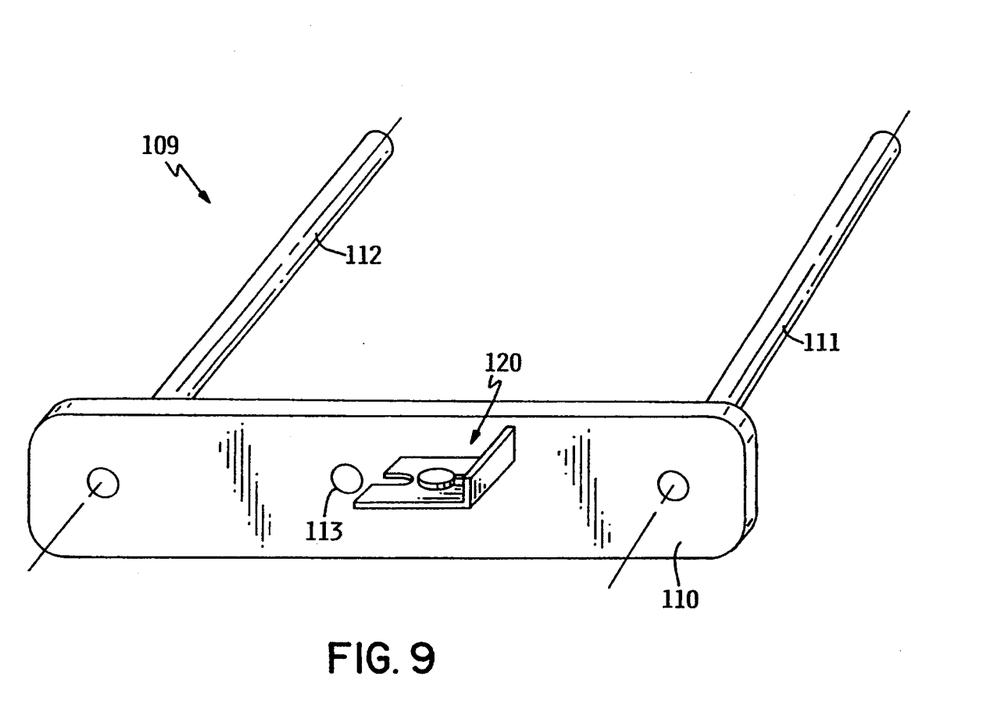
FIG. 9 shows a pictorial view of a cover latch for attaching the cover to the housing.

Referring to FIG. 9, there is shown a pictorial view of a cover latch 109 for securing cover 13 to housing 11. Cover latch 109 includes a front plate 110 with a first cylindrical latch pin 111 secured to and extending perpendicular to plate 110 and a second cylindrical latch pin 112 secured to and extending perpendicular to plate 110. Plate 110 includes a shoulder pin opening 113 for passing over shoulder pin 55 (FIG. 5) located on the front of housing 11. Next to opening 113 is a finger-activated slide latch 120. Since the finger-activated slide latches 120, 42 and 43 are identical in operation, as well as the shoulder pins, they will not be described herein.

Figure 10:
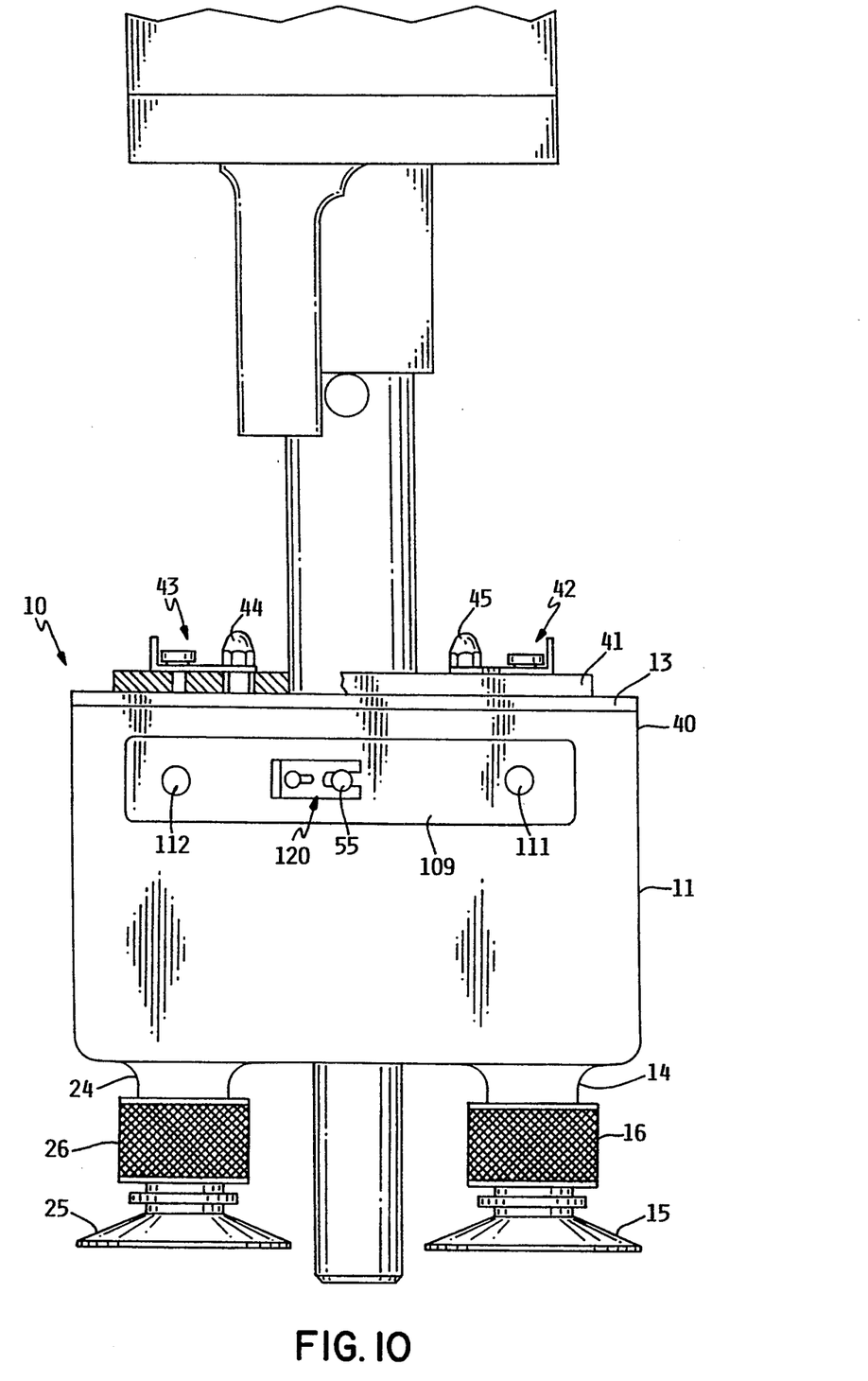
FIG. 10 is a front view showing the end effector housing and cover engaged through the cover latch of FIG. 9.

In order to understand the operation of cover latch 109, reference should be made to FIGS. 1, 2, 5 and 10. In order to secure cover 13 to housing 11, the operator places cover 13 with vacuum tube 37 into housing 11, as shown in FIG. 1. When cover 13 is located on housing 11, the operator then inserts cover latch 109 with the cylindrical latch pins 111 and 112 into openings 53 and 54 in housing sidewall 11d. Next the operator extends cylindrical latch pins 111 and 112 through cylindrical latch pin bores 73 and 71 in cover 13 and then into the openings 52 and 51 in the side wall 11b of housing 11. The result is that cover 13 is pinned to housing 11 through cylindrical latch pins 111 and 112 coacting with bores 73 and 71. To prevent accidental disassembly of cover latch 109 from housing 11, there is included slide latch 120 which engages shoulder pin 55 on housing 11 to prevent withdrawal of the cylindrical latch pins from the housing (FIG. 10). Thus, cover 13 and housing 11 are pinned to each other and held in position through a cover latch securable by a finger-activated slide latch 120. The use of a finger-activated slide latch permits an operator to quickly disassemble and clean housing 11, cover latch 109, cover 13 and ranged vacuum tube 37. The cleaning becomes significant when the device is used for picking up items of food which require periodic cleaning of the end effector to make sure that bacteria will not be transmitted from one food to another that is handled by the end effector.

Note, removing the cover from the end effector also permits vacuum piston 30, sealing ring 40 and spring 35 to be removed from housing 11 for cleaning.

An advantage of the present invention is that the end effector 10 can be disassembled for cleaning without the use of tools. The end effector 10 includes a housing having a plenum chamber 12 to catch and retain large particles and a flexible vacuum cup 15 with an air passage 17 connecting plenum chamber 12 to the flexible vacuum cup 15. A vacuum tube 37 extends into plenum chamber 12 with the vacuum tube having a central axis, an exterior surface for engaging vacuum piston 30 and a lateral air inlet 31. Located around vacuum tube 37 is a cylindrical cup-shaped vacuum piston 30 having a central axis and an internal cylindrical surface 33 for sliding coaxially along the axis of vacuum tube 37. The cylindrical cup-shaped vacuum piston 30 has a lateral air inlet 31 to allow air to discharge into vacuum tube 37. A sensor rod 32 connects to the cylindrical cup-shaped vacuum piston 30 with sensor rod 32 slideably mounted in the housing 11 to permit axial displacement of the vacuum piston 30 in response to axial displacement of the sensor rod 32 to cause the lateral air inlet 38 of vacuum tube 37 to be in fluid communication with the lateral air inlet 31 of the cylindrical cup-shaped vacuum piston 30. This allow air to be rapidly drawn through vacuum cups 15 and 25, and plenum chamber 12 to permit end effector 10 to quickly lift and hold an object proximate to the vacuum cup through negative pressure.

The end effector which can be disassembled for cleaning without the use of tools includes three finger activateable slide latches 42, 43 and 120 for holding the components of end effector 10 together. Housing 11 includes side walls and a bottom with the side walls having openings for receiving cover latch 109. The use of a finger-activated slide latch permits a user to lock the cover latch 109 in position in housing 11 as well as flange 41 without the use of any tools.

Another feature of the invention is that, by isolating the controls to each of the vacuum cups, one can select any of the six heads to pick up an article or to drop any or all of the articles. Furthermore, feedback can be sent to the robot controls to alert a person to the fact that there may have been a failed pickup.

Figure 11:
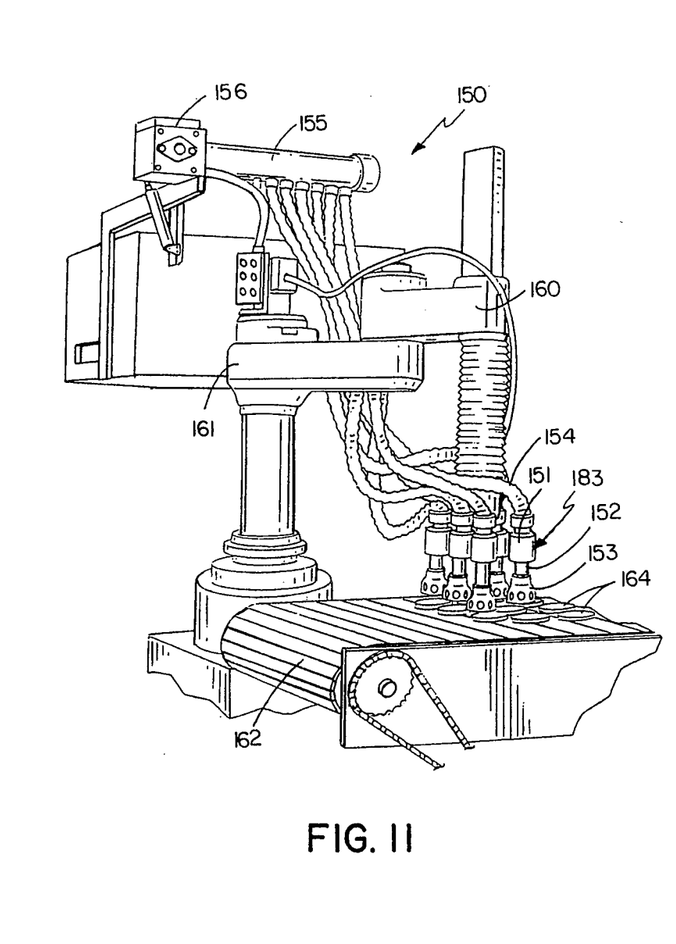
FIG. 11 shows a pictorial view of an alternate embodiment.

FIG. 11 shows an alternate embodiment of the invention wherein all six units are controlled by a single ball check valve 156. Since the six pickup devices shown are identical, only one will be described.

System 150 includes a first movable arm 160 and a second movable arm 161 which are movable to position the end effectors proximate the top of meat patties 164 located on a conveyor 162. System 150 differs from the system of FIGS. 1-10 in that, instead of having a large vacuum plenum chamber at each vacuum cup, the system 150 includes an elongated vacuum chamber which substantially extends from each of the vacuum cups to a shut-off valve 156.

FIG. 11 shows the vacuum chamber comprising a plenum chamber 155, a set of large, flexible hoses 154, and a stainless steel movable pipe housing 152, which connects to vacuum cups located in each of the ends of the movable pipe housing.

Figure 12:
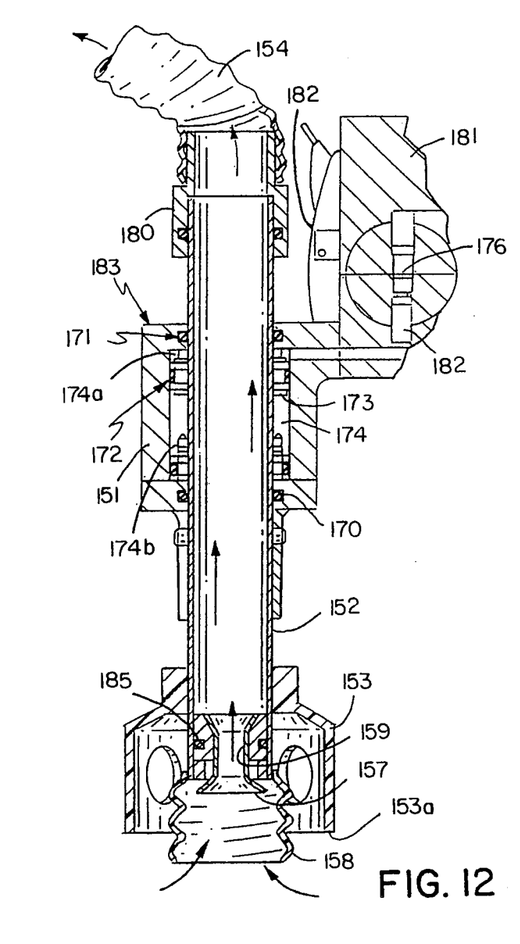
FIG. 12 is a partial view of the end effector housing and cover.

FIGS. 11 and 12 illustrate that the diameter of housing 152, the diameter of plenum chamber 155 and the diameter of flexible hoses 154 are sufficiently large to provide an elongated vacuum chamber which permits one to rapidly draw air through vacuum cup 158, connector 157 and throat 159. Connector 157 is made of plastic with a central throat 159 for drawing air through. A sealing ring 185 extends around member 157 to seal the outside of connector 157 in pipe housing 152. Bellows shaped vacuum cup 158 allows one to pick up coarse-textured articles such as frozen meat patties as housing 152 moves up and down within a support housing 151. That is, support housing 151 includes a first sealing ring 170 and a second sealing ring 171 which prevent air from escaping from an annular chamber 174 located around housing 152. Located around the ends of pipe housing 152 is a stabilizer 153 that acts as a stop for the article to help stabilize the article as it is moved from place to place. That is, as bellows-like vacuum cup 158 collapses upward when an article is drawn against the vacuum cup, it continues to pull the article upward until edge 153a acts as a stop to prevent further movement of the article. The result is the article does not move as one moves the workhead since the stabilizer 153 acts as a stop.

In order to facilitate cleaning, pipe 152 is made of stainless steel and throat member 157 of a suitable plastic so the working portion can be disassembled for cleaning.

Attached to housing 152 is an annular piston-like member 173 having a sealing ring 172 extending there around to divide chamber 174 into an upper annular chamber 174a and a lower annular chamber 174b.

An end effector housing 183 connects to main housing 181 through a latch 182 to permit removal of the end effectors as a unit.

To lower housing 152, a valve 176 applies air to upper annular chamber 174a located above sealing ring 172. The high pressure air forces piston-like member 173 downward in chamber 174, thus lowering housing 152 and a bellows-like vacuum cup 158. When the process is reversed, and high pressure air is directed to lower annular chamber 174b, movable pipe housing 152 moves upward lifting the article held by vacuum cup 158.

In the system illustrated in FIG. 11, a single ball-check valve 156 controls the vacuum in vacuum cup 158 which attaches directly to connector 157 on the lower end of cylindrical housing 152. A connector 180 on the opposite end of cylindrical pipe housing 152 connects flexible hose 154 to the other end of the pipe housing 152 to provide a continuous, elongated vacuum chamber for quickly removing air from vacuum cup 158.

In the system 150, the end effector is operable for picking up an article through air pressure differential across the article. A bellows-shaped vacuum cup 158 having a central passage therein connects to a movable pipe 152 having a first end connected to bellows cup 158 and, a second end connected to flexible pipe 154. Located around movable pipe 152 is an annular piston 172 which is secured to the intermediate region of movable pipe 152. Located around movable pipe 152 is a housing 151 having a chamber 174 therein. In operation, the annular piston 172 is slidable in chamber 174. Annular piston 172 coacts with chamber 174 to defining an upper annular compartment 174a and a lower annular compartment 174b in chamber 174 so that when air pressure in the upper compartment 174a exceeds the air pressure in the lower compartment 174b, the annular piston 172 slides in chamber 174 to move movable pipe 152 in a first direction and when the air pressure in the lower compartment 174b exceeds the air pressure in the upper compartment 174a, the annular piston slides in chamber 174 to move movable pipe 152 and vacuum cup 158 in a second direction opposite to the first direction. The combination of the flexible tubing 154, movable pipe 152 and vacuum cup 158 forms a continuous, rapid air evacuation chamber to permit lifting an article from a surface of a conveyor by rapidly drawing air through vacuum cup 158 to thereby provide a pressure differential across an article whenever an article is located proximate said vacuum cup. The use of a plenum chamber that extends from the vacuum cup to the valve housing permits for rapid withdrawal of air to provide a strong pressure differential to pick up an article.

The present invention is suitable for raw and cooked meat products, bakery goods, fruits, and produce since the unit can be readily disassembled for cleaning.

I claim:

1. An end effector housing carrying a pair of end effectors for picking up articles through air pressure differential across the articles comprising:
   a plenum chamber;
   a first bellows-shaped collapsible vacuum cup for directly contacting a first article to be picked up, said bellows-shaped collapsible vacuum cup having a central passage therein;
   a first stabilizer located proximate said first bellows-shaped collapsible vacuum cup to act as a stop to prevent an article carried by said first bellows-shaped collapsible vacuum cup from moving with respect to said first bellows-shaped collapsible vacuum cup as said first bellows-shaped collapsible vacuum cup is moved from place to place with said first stabilizer and said first bellows-shaped collapsible vacuum cup located on the same side of an article to be picked up;
   a first movable pipe having a first end connected to said first bellows-shaped collapsible vacuum cup, said first movable pipe having a second end and an intermediate region;
   a first flexible hose having a first end and a second end with said first end connected to said plenum chamber and said second end connected to said second end of said first movable pipe to form an elongated air evacuation chamber for rapid air evacuation from said first bellows-shaped collapsible vacuum cup;
   a second bellows-shaped collapsible vacuum cup for directly contacting a first article to be picked up, said second bellows-shaped collapsible vacuum cup having a central passage therein;
   a second stabilizer located proximate said second bellows-shaped collapsible vacuum cup to act as a stop to prevent an article carried by said second bellows-shaped collapsible vacuum cup from moving with respect to said second bellows-shaped collapsible vacuum cup as said second bellows-shaped collapsible vacuum cup is moved from place to place with said second stabilizer and said second bellows-shaped collapsible vacuum cup located on the same side of an article to be picked up;
   a second movable pipe having a first end connected to said second bellows-shaped collapsible vacuum cup, said second movable pipe having a second end and an intermediate region;

a second flexible hose having a first end and a second end with said first end connected to said plenum chamber and said second end connected to said second end of said second movable pipe to form an elongated air evacuation chamber for rapid air evacuation from said second bellows-shaped collapsible vacuum cup;

a first annular piston located around and secured to said intermediate region of said first movable pipe;

a first housing having a chamber therein, said first annular piston slidable in said chamber of said first housing with said first annular piston coacting with said chamber of said first housing to define an upper and a lower compartment in said chamber of said first housing so that when air pressure in the upper compartment of said first housing exceeds the air pressure in the lower compartment of said first housing, the first annular piston slides in said chamber of said first housing to move said first movable pipe in a first direction and when the air pressure in the lower compartment of said first housing exceeds the air pressure in the upper compartment of said first housing, the first annular piston slides in said chamber of said first housing to move said first movable pipe in a second direction opposite said first direction;

a second annular piston located around and secured to said intermediate region of said second movable pipe; and a second housing having a chamber therein, said second annular piston slidable in said chamber of said second housing with said second annular piston coacting with said chamber of said second housing to define an upper and a lower compartment in said chamber of said second housing so that when air pressure in the upper compartment of said second housing exceeds the air pressure in the lower compartment of said second housing, the second annular piston slides in said chamber of said second housing to move said second movable pipe in a first direction and when the air pressure in the lower compartment of said second housing exceeds the air pressure in the upper compartment of said second housing, the second annular piston slides in said chamber of said second housing to move said second movable pipe in a second direction opposite said first direction with said first flexible hose connected to said first movable pipe and said second flexible hose to said second movable pipe to permit lifting articles from a surface by rapidly drawing air through said first bellows-shaped collapsible vacuum cup and said second bellows-shaped collapsible vacuum cup to thereby quickly provide a pressure differential across an article when an article to be lifted is located proximate said bellows-shaped collapsible vacuum cups so that said first bellows-shaped collapsible vacuum cup and said second bellows-shaped collapsible vacuum cup can simultaneously pick up different articles for transport to a second location.

2. The end effector housing of claim 1 wherein said first stabilizer located proximate said first bellows-shaped collapsible vacuum cup is carried by said first movable pipe and said second stabilizer located proximate said second bellows-shaped collapsible vacuum cup is carried by said second movable pipe with each of said stabilizers located peripherally outward of said bellows-shaped collapsible vacuum cup.

3. The end effector housing of claim 2 including a detachable housing for connecting said end effector housing to a movable arm for positioning said bellows-shaped collapsible vacuum cups proximate articles to be picked up.

* * * * *